(12) United States Patent
Yoon et al.

(10) Patent No.: US 7,383,314 B1
(45) Date of Patent: *Jun. 3, 2008

(54) USER PREFERENCE INFORMATION STRUCTURE HAVING MULTIPLE HIERARCHICAL STRUCTURE AND METHOD FOR PROVIDING MULTIMEDIA INFORMATION USING THE SAME

(75) Inventors: Kyoung Ro Yoon, Seoul (KR); Jung Min Song, Seoul (KR); Sung Bae Jun, Seoul (KR)

(73) Assignee: LG Electronics, Inc., Seoul (KR)

( * ) Notice: Subject to any disclaimer, the term of this patent is extended or adjusted under 35 U.S.C. 154(b) by 119 days.

This patent is subject to a terminal disclaimer.

(21) Appl. No.: 09/666,280

(22) Filed: Sep. 21, 2000

(30) Foreign Application Priority Data

Sep. 22, 1999 (KR) ................................ 1999-41190

(51) Int. Cl.
G06F 15/16 (2006.01)
(52) U.S. Cl. ...................... 709/217; 709/203; 709/219; 709/224; 709/232; 725/46; 707/6; 707/104.1
(58) Field of Classification Search ................ 709/217, 709/219, 226, 229, 203, 224, 232; 707/10, 707/5, 101, 104, 3, 104.1; 725/34, 46, 9, 725/47
See application file for complete search history.

(56) References Cited

U.S. PATENT DOCUMENTS

| | | |
|---|---|---|
| 5,063,522 A | 11/1991 | Winters |
| 5,167,011 A | 11/1992 | Priest |
| 5,239,617 A | 8/1993 | Gardner et al. |
| 5,448,727 A | 9/1995 | Annevelink |
| 5,483,637 A | 1/1996 | Winokur et al. |
| 5,506,984 A | 4/1996 | Miller |
| 5,687,290 A | 11/1997 | Lewis |

(Continued)

FOREIGN PATENT DOCUMENTS

WO    WO 98/35297    8/1998

(Continued)

OTHER PUBLICATIONS

European Search Report for European Application No. 04030886.8 dated Sep. 19, 1996.

(Continued)

Primary Examiner—Oanh Duong
(74) Attorney, Agent, or Firm—Sidley Austin LLP

(57) ABSTRACT

A user preference information structure having a multiple hierarchical structure in which an information is provided to a user according to a user preference in a multi-media environment consisting of an information provider and an information user, comprising
user use information by using information desired by the user; user preference information of information desired by the user; and individual user preference information that is differently set depending on situations in which the user is put and positioned in a sub-tree of the user preference information. The hierarchical data structure is able to provide the user preference for providing information desired by the user is provided depending on the environment, based on which various information can be provided. The hierarchical data structure constructing the user preference makes it possible for the user to receive information fitting the situation in which he or she is put by using a proper individual user preference information, automatically or according to user's selection.

26 Claims, 9 Drawing Sheets

U.S. PATENT DOCUMENTS

| | | | |
|---|---|---|---|
| 5,712,960 | A | 1/1998 | Chiopris et al. |
| 5,724,508 | A | 3/1998 | Harple, Jr. et al. |
| 5,732,216 | A | 3/1998 | Logan et al. |
| 5,758,257 | A * | 5/1998 | Herz et al. ............... 725/116 |
| 5,758,259 | A | 5/1998 | Lawler ................... 455/5.1 |
| 5,875,327 | A | 2/1999 | Brandt et al. ............ 395/651 |
| 5,945,988 | A * | 8/1999 | Williams et al. .......... 715/747 |
| 5,991,735 | A * | 11/1999 | Gerace ................... 705/10 |
| 6,012,051 | A | 1/2000 | Sammon et al. |
| 6,088,722 | A | 7/2000 | Hertz et al. |
| 6,236,395 | B1 * | 5/2001 | Sezan et al. ............. 715/723 |
| 6,279,007 | B1 * | 8/2001 | Uppala ................... 707/101 |
| 6,321,221 | B1 * | 11/2001 | Bieganski ................ 707/5 |
| 6,334,127 | B1 | 12/2001 | Bieganski et al. |
| 6,366,906 | B1 * | 4/2002 | Hoffman .................. 707/3 |
| 6,366,915 | B1 * | 4/2002 | Rubert et al. ............ 707/10 |
| 6,412,012 | B1 * | 6/2002 | Bieganski et al. ......... 709/232 |
| 6,421,675 | B1 * | 7/2002 | Ryan et al. .............. 707/100 |
| 6,421,733 | B1 * | 7/2002 | Tso et al. ................ 709/246 |
| 6,446,261 | B1 | 9/2002 | Rosser |
| 6,460,025 | B1 * | 10/2002 | Fohn et al. .............. 706/45 |
| 6,460,036 | B1 * | 10/2002 | Herz ..................... 707/10 |
| 6,470,344 | B1 * | 10/2002 | Kothuri et al. ........... 707/100 |
| 6,493,702 | B1 * | 12/2002 | Adar et al. .............. 707/3 |
| 6,546,390 | B1 * | 4/2003 | Pollack et al. ........... 707/7 |
| 6,571,279 | B1 * | 5/2003 | Herz et al. .............. 709/217 |
| 6,601,103 | B1 * | 7/2003 | Goldschmidt Iki et al. . 709/231 |
| 6,635,089 | B1 * | 10/2003 | Burkett et al. ............ 715/513 |
| 6,947,935 | B1 | 9/2005 | Horvitz et al. |
| 7,035,871 | B2 | 4/2006 | Hunt et al. |
| 7,096,486 | B1 | 8/2006 | Ukai et al. |
| 2002/0026349 | A1 * | 2/2002 | Reilly et al. ............. 705/14 |
| 2002/0038342 | A1 * | 3/2002 | Ito ....................... 709/203 |
| 2002/0052880 | A1 * | 5/2002 | Fruensgaard et al. ...... 707/104.1 |
| 2002/0059363 | A1 * | 5/2002 | Katz et al. ............... 709/203 |
| 2002/0059584 | A1 * | 5/2002 | Ferman et al. ............ 725/34 |
| 2002/0199188 | A1 | 12/2002 | Sie et al. |
| 2003/0004934 | A1 * | 1/2003 | Qian ..................... 707/3 |
| 2003/0051256 | A1 | 3/2003 | Uesaki et al. |
| 2003/0078986 | A1 | 4/2003 | Ayres et al. |
| 2003/0225777 | A1 * | 12/2003 | Marsh .................... 707/101 |
| 2004/0128301 | A1 * | 7/2004 | Thint et al. .............. 707/101 |
| 2004/0177370 | A1 | 9/2004 | Dudkiewicz |
| 2005/0120390 | A1 | 6/2005 | Nonoyama |
| 2006/0015580 | A1 | 1/2006 | Gabriel et al. |
| 2006/0150216 | A1 | 7/2006 | Hertz et al. |
| 2006/0161952 | A1 | 7/2006 | Hertz et al. |

FOREIGN PATENT DOCUMENTS

WO      WO 99/39281      8/1999

OTHER PUBLICATIONS

Custom URL—HTTP://WWW/IRT.DE/CUSTOM/CTV_DEL_01.PDF, "CustomTv Deliverable 1—CustomTv Service and System Requirements," ACTS Project AC360, Dec. 8, 1998, pp. 1-42.

Sanguantrakul et al., "A User Customized Selection and Categorization for Broadcast Data," Parallel Processing 1999 Proceedings, 1999 International Workshops on Aizu-Wakamatsu, Japan, Los Alamitos, CA, USA IEEE, Sep. 21, 1999, pp. 596-601.

Tsutomu Terada, "Study on Active Databases for Broadcasting Data," Master Thesis, [Online], Feb. 16, 1999, pp. 1-51.

Canadian Office Action for Canadian Application No. 2,320,506 dated Sep. 18, 2006.

Tsinaraki et al. "Sematic User Preference Description in MPEG-7/21." <http://www.ics.forth.gr/hdms05/pid/PID-6.pdf>.

Tsinaraki et al. "Sematic User Preference Description in MPEG-7/21." <http://www.ics.forth.gr/hdms05/pid/PID-6.pdf> date unknown.

* cited by examiner

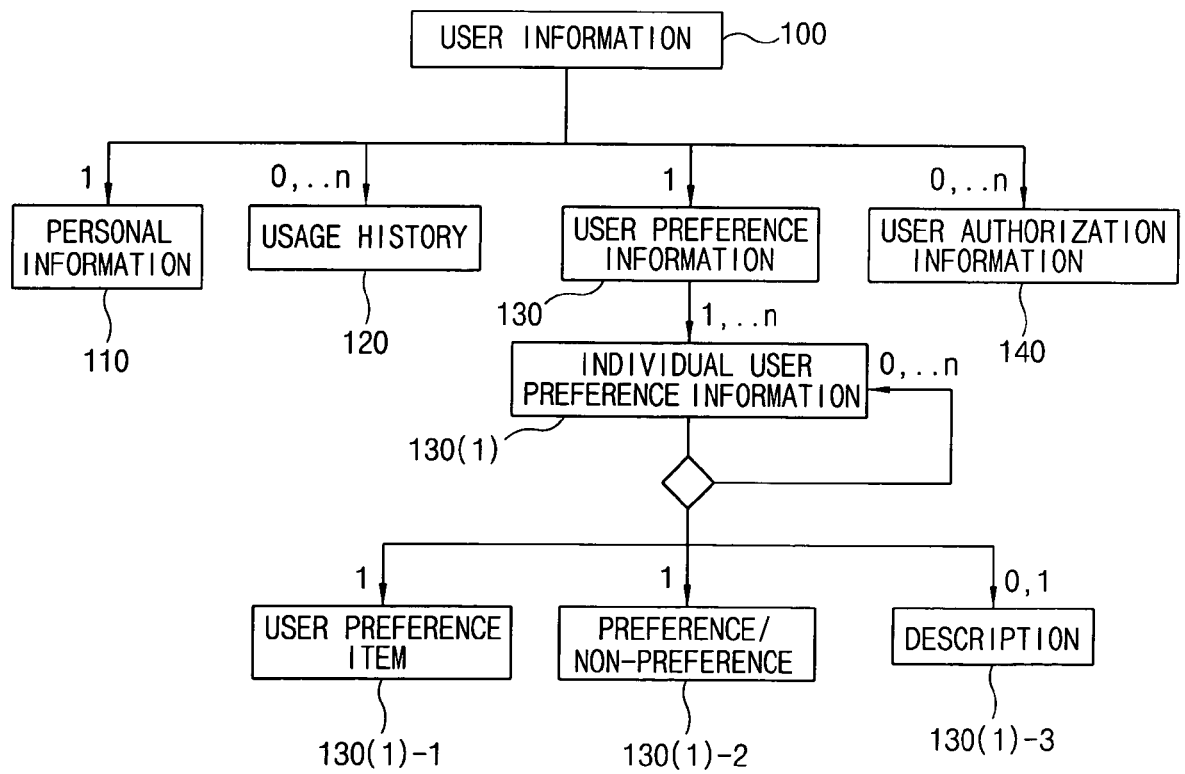

|  | SELF IDENTIFIERS | PREFERENCE ITEMS | PREFERENCE VALUES | DESCRIPTIONS |
|---|---|---|---|---|
| 0 | 1 | ENTERTAINMENT | 86 | GENERAL INFO. |
| 1 | 17 | MUSIC | 43 | GENERAL INFO. |
| 17 | 181 | POP MUSIC | 27 | GENERAL INFO. |
| 181 | 205 | NEW AGE | 12 | GENERAL INFO. |
| 0 | 6 | PERSON | 97 | GENERAL INFO. |
| 6 | 67 | FEMALE SINGERS | 60 | GENERAL INFO. |
| 67 | 197 | FEMALE SINGER "C" | 19 | GENERAL INFO. |
| ... | ... | ... | ... | ... |

FIG. 7

| ITEM IDENTIFIERS (8BYTES) | | | | PREFERENCE ITEMS | PREFERENCE VALUES | DESCRIPTIONS |
|---|---|---|---|---|---|---|
| 1ST 2BYTES | 2ND 2BYTES | 3RD 2BYTES | 4TH 2BYTES | | | |
| 1 | 0 | 0 | 0 | ENTERTAINMENT | 86 | GENERAL INFO. |
| 1 | 17 | 0 | 0 | MUSIC | 43 | GENERAL INFO. |
| 1 | 17 | 181 | 0 | POP MUSIC | 27 | GENERAL INFO. |
| 1 | 17 | 181 | 205 | NEW AGE | 12 | GENERAL INFO. |
| 6 | 0 | 0 | 0 | PERSON | 97 | GENERAL INFO. |
| 6 | 67 | 0 | 0 | FEMALE SINGERS | 60 | GENERAL INFO. |
| 6 | 67 | 197 | 0 | FEMALE SINGER "C" | 19 | GENERAL INFO. |
| ... | ... | ... | ... | ... | ... | ... |

FIG. 8

| ITEM IDENTIFIERS (8BYTE)S | | | PREFERENCE ITEMS | PREFERENCE VALUES | DESCRIPTIONS |
|---|---|---|---|---|---|
| 1ST 2BYTES | 2ND 2BYTES | 3RD 2BYTES | | | |
| 1 | 17 | 181 | 205 | NEW AGE | 12 | GENERAL INFO. |
| 6 | 67 | 197 | 0 | "C" | 19 | GENERAL INFO. |
| ... | ... | ... | ... | ... | ... |

FIG. 9

| PREFERENCE ITEM IDENTIFIERS | PREFERENCE ITEMS | PREFERENCE VALUES | DESCRIPTIONS |
|---|---|---|---|
| 1 | ENTERTAINMENT | 86 | GENERAL INFO. |
| 17 | MUSIC | 43 | GENERAL INFO. |
| 181 | POP MUSIC | 27 | GENERAL INFO. |
| 205 | NEW AGE | 12 | GENERAL INFO. |
| 6 | PERSON | 97 | GENERAL INFO. |
| 67 | FEMALE SINGERS | 60 | GENERAL INFO. |
| 197 | FEMALE SINGER "C" | 19 | GENERAL INFO. |
| ... | ... | ... | ... |

FIG. 10

| PREFERENCE ITEM IDENTIFIERS | PREFERENCE ITEMS | LEVELS | |
|---|---|---|---|
| 1 | ENTERTAINMENT | 0 | |
| 2 | INFORMATION | 0 | |
| 3 | NEWS | 0 | |
| 4 | EDUCATION | 0 | |
| 5 | ARTS | 0 | |
| 6 | PERSON | 0 | |
| ... | ... | ... | ... |
| 11 | DRAMA | 1 | 1 |
| 12 | CONCERT | 1 | 1 |
| 13 | GAME SHOW | 1 | 1 |
| 14 | VARIETY SHOW | 1 | 1 |
| 15 | TALK SHOW | 1 | 1 |
| 16 | MOVIE | 1 | 1 |
| 17 | MUSIC | 1 | 1 |
| 18 | SPORTS | 1 | 1 |
| 19 | ETC | 1 | 1 |
| 21 | SERVICE INFORMATION | 1 | 2 |
| 22 | PRODUCT INFORMATION | 1 | 2 |
| 23 | LOCAL INFORMATION | 1 | 2 |
| ... | ... | ... | ... |
| 31 | POLITICS | 1 | 3 |
| 32 | ECONOMICS | 1 | 3 |
| 33 | INTERNATIONAL | 1 | 3 |
| 34 | LOCAL | 1 | 3 |
| 35 | SOCIETY | 1 | 3 |
| 36 | SHOW BUSINESS/CULTURE | 1 | 3 |
| 37 | SCIENCE/TECHNOLOGY | 1 | 3 |
| ... | ... | ... | ... |
| 41 | VISUAL ARTS | 1 | 5 |
| 42 | AUDITORY ARTS | 1 | 5 |
| 43 | PERFORMANCE ARTS | 1 | 5 |
| ... | ... | ... | ... |
| 61 | ACTOR | 1 | 6 |
| 62 | ACTRESS | 1 | 6 |
| 63 | DIRECTOR | 1 | 6 |
| 64 | MALE ANCHOR | 1 | 6 |
| 65 | FEMALE ANCHOR | 1 | 6 |
| 66 | SINGER | 1 | 6 |
| ... | ... | ... | ... |
| 161 | ACTION | 2 | 16 |

FIG.12A

| PREFERENCE ITEM IDENTIFIERS | PREFERENCE ITEMS | LEVELS | |
|---|---|---|---|
| 1 | ENTERTAINMENT | 0 | |
| ... | ... | ... | ... |
| 5 | ARTS | 0 | |
| 6 | PERSON | 0 | |
| ... | ... | ... | ... |
| 12 | CONCERT | 1 | 1 |
| ... | ... | ... | ... |
| 17 | MUSIC | 1 | 1 |
| ... | ... | ... | ... |
| 41 | VISUAL ARTS | 1 | 5 |
| 42 | AUDITORY ARTS | 1 | 5 |
| 43 | PERFORMANCE ARTS | 1 | 5 |
| ... | ... | ... | ... |
| 181 | POP MUSIC | 2 | 17 |
| 182 | CLASSICAL | 2 | 17 |
| ... | ... | ... | ... |
| 207 | SAMULNORI | 3 | 181 |
| ... | ... | ... | ... |

FIG. 12B

| PREFERENCE ITEM IDENTIFIERS | PREFERENCE ITEMS | LEVELS | |
|---|---|---|---|
| 1 | ENTERTAINMENT | 0 | |
| ... | ... | ... | ... |
| 5 | ARTS | 0 | |
| 6 | PERSON | 0 | |
| ... | ... | ... | ... |
| 12 | CONCERT | 1 | 1 |
| ... | ... | ... | ... |
| 17 | MUSIC | 1 | 1 |
| ... | ... | ... | ... |
| 41 | VISUAL ARTS | 1 | 5 |
| 42 | AUDITORY ARTS | 1 | 5 |
| 43 | PERFORMANCE ARTS | 1 | 5 |
| ... | ... | ... | ... |
| 181 | POP MUSIC | 2 | 42 |
| 182 | CLASSICAL | 2 | 42 |
| ... | ... | ... | ... |
| 207 | SAMULNORI | 3 | 181 |
| ... | ... | ... | ... |

USER PREFERENCE INFORMATION STRUCTURE HAVING MULTIPLE HIERARCHICAL STRUCTURE AND METHOD FOR PROVIDING MULTIMEDIA INFORMATION USING THE SAME

BACKGROUND OF THE INVENTION

1. Field of the Invention

The present invention relates to a user preference information structure having a multiple hierarchical structure and a method for providing multimedia information using the same which are capable of quickly and easily recommending and providing information desired by information user in a multimedia service system environment consisting of an information provider and an information user.

2. Description of the Background Art

In a multimedia service system environment consisting of an information provider and an information user, the information user can hardly absorb explosively increasing amount of information. The same phenomenon also occurs in the Internet environment that offers huge amount of information as well as in a television broadcast environment that offers entertainment and life information.

Besides, as communication techniques are progressively developed, new providers such as a cable TV appear to provide diverse information.

However, notably, as information providers increase in number more and more, information users find it difficult to quickly and accurately search desired information provided by the information providers.

Accordingly, in order to provide the information users quickly and easily with desired information by the information providers, researches have been conducted and methods have been sought and developed that programs or information preferred by information users (briefly referred to as 'users', hereinafter) are recommended or automatically selected on the basis of a user preference value for information desired by users.

In the methods for providing information in accordance with conventional arts, user preference information by items of information desired by users is constructed on the basis of a use record (that is, a user profile) that has been used by a user by direct selection, so as to be provided to users.

However, the information providing methods of the conventional arts are not able to adequately cope with situations that user preference values are differently set for the same information according to user's wish and that relationships between items of information are complicate and a user preference value for a single item has a different meaning according to an environment and a relationship with a different item or may be changed to a different user preference value.

For example, a user 'A', who likes a movie in which an actor 'B' played a role (a person>an actor>'B'), may dislike a movie directed by the actor 'B' (a person<director>'B'). Besides, though a user preference value of an upper item is low, a user preference value of a lower item is high, or otherwise, a user preference value of the upper item may be high while a user preference value of the lower item is low. For these situations, the information providing methods of the conventional arts fail to provide proper information adaptively.

As a different example, the user 'A' may want a movie with lots of violence scenes as he or she prefers a movie of violence, but, he may not want violence scenes with a news program or educational information that he or she watches on TV with children, sitting in front of a television set. In this case, the information providing methods of the conventional arts fails to provide proper information according to situations in which in case that an upper item is set as a movie for a violence scene, its user preference value becomes high, while in case that an upper item is set as a news program or an educational stuff, the user preference value becomes low.

Meanwhile, a user preference value on information can be different depending on situations that the user is put, with which the information providing methods of the conventional arts can hardly cope.

For example, the user may prefer a melodrama or a family movie in a rainy day, or he or she may prefer an action movie in a sunny day. That is, for the same movie item, user preference is different according to situations in which the user is put. The information providing methods of the conventional arts do not properly cope with it.

In addition, the user preference may be different depending on a receiving device used by the user, with which the information providing methods of the conventional arts can hardly cope.

For example, in case that the user watches a movie on a TV with his or her family in a living room, the user may prefer a family-rated movie, while in case that the user watches a movie on a TV in his or her own room, he or she may prefer a movie that is not allowed for minors. The information providing methods of the conventional arts do not properly cope with it.

FIG. 1 illustrates user preference values of each item of information in accordance with a conventional art, in which user preference items (i.e., entertainment, music and pop music, etc) are allocated with specific item identifiers (1, 17, 181, . . . ) and correspondingly independent user preference values (86, 43, 27, . . . ).

Accordingly, relationships between each item is not expressed and the user preference value of each item is constantly maintained even if an environment is changed, so that no proper information can be provided for a situation in which the user is put.

In addition, in order to update user preference information, each corresponding item should be included in the use information. That is, in case that classified information only includes a name of a singer 'C' and a genre of a 'new age', not including 'entertainment' or 'music', only the 'C' item' and the 'new age' item are updated, while the user preference value for the relevant upper item such as 'entertainment, 'music', 'pop music', 'person' and 'woman singer' is not updated.

SUMMARY OF THE INVENTION

Therefore, an object of the present invention is to provide a data structure having a multiple hierarchical structure and an information providing method fitting a user preference by using the data structure, to provide information desired by an information user.

Another object of the present invention is to provide a method for editing a data structure having a multiple hierarchical structure, to provide information desired by an information user.

Still another object of the present invention is to provide a method for providing information by users and by preferences, in which various independent individual user preference information structures are defined and each user preference item and user preference/non-preference included in the individual user preference information structure defines a relationship in a hierarchical structure, whereby user preference/non-preference are defined from specific items to general items, and an adoption condition of each individual user preference information structure is defined, so that detailed information can be recommended, provided or limited according to a user preference that may be different depending on situations and information fitting situations can be recommended, provided or limited.

To achieve these and other advantages and in accordance with the purpose of the present invention, as embodied and broadly described herein, there is provided a user preference information structure having a multiple hierarchical structure in which an information is provided to a user according to a user preference in a multi-media environment consisting of an information provider and an information user, including user use information by using information desired by the user; user preference information of information desired by the user; and individual user preference information that is differently set depending on situations in which the user is put and positioned in a sub-tree of the user preference information.

To achieve the above objects, there is also provided a method for providing multi-media information by using a multiple hierarchical structure in which information is provided to a user according to a user preference in an environment consisting of an information provider and an information user, including the steps of: establishing a multiple hierarchical structure having individual user preference information by users and by search items for user preference information of searching items of the user; searching user preference item information having user preference/non-preference by users and searching items; and providing searched information according to preference of the user.

To achieve the above objects, there is also provided a method for editing a multiple hierarchical data structure in which information is provided to a user according to a user preference in an environment consisting of an information provider and an information user, including the steps of: establishing a multiple hierarchical structure having individual user preference information by users and by search items for user preference information of searching items of the user; and changing a user preference information structure in case that a hierarchical structure between items is changed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIG. 1 illustrates a user preference structure by items of information in accordance with a conventional art;

FIG. 2 is a schematic view showing a multiple hierarchical data structure in accordance with the present invention;

FIG. 7 is a table showing the hierarchical structure of FIG. 2 by using a coding scheme of the item identifier of FIG. 6 in accordance with the present invention;

FIG. 8 is a table showing the hierarchical structure of FIG. 2 by using the individual user preference information of the leaf nodes of the hierarchical tree structure in accordance with the present invention;

FIG. 9 is a table showing a hierarchical structure of FIG. 1 by using an item dictionary of FIG. 10 in accordance with the present invention;

FIG. 10 is a table showing dictionary items for the user preference items
in accordance with the present invention;

FIG. 12A is a table showing an item dictionary before it is changed in accordance with the present invention; and FIG. 12B is a table showing an item dictionary after it is changed in accordance with the present invention.

DETAILED DESCRIPTION OF THE PREFERRED EMBODIMENTS

Figure 3:
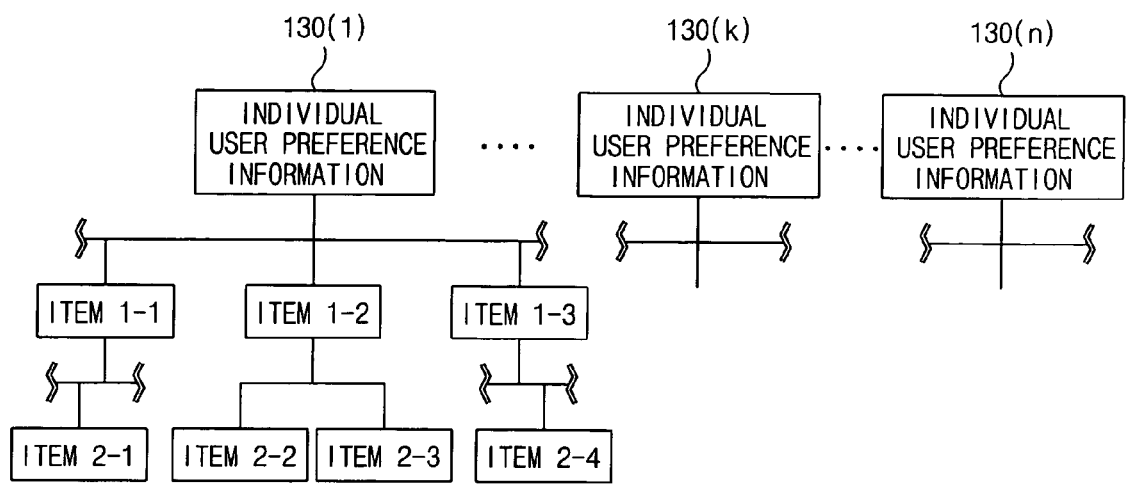
FIG. 3 shows a multiple structure of user preference items of individual user preference information structures of FIG. 2 in accordance with the present invention.

Reference will now be made in detail to the preferred embodiments of the present invention, examples of which are illustrated in the accompanying drawings.

FIG. 2 is a schematic view showing a multiple hierarchical data structure in accordance with the present invention.

As shown in the drawing, user information 100 for a single user or single group of users contains personal information 110, a plurality (0, 1, . . . , n) of usage history 120, user preference information 130 and a plurality of user authorization information 140.

The user preference information 130 contains a plurality (1, 2, . . . , n) of individual user preference information 130(1) and the individual user preference information 130(1) contains a user preference item 130(1)-1 and user preference/non-preference 130(1)-2 and a description 130(1)-3.

The personal information 110 may includes a name, a sex, an age and date and year of birth of a user in addition to a user ID.

The usage history 120 includes information on when (year, month, data, time), where (a client system ID, or location), how (information as to when an action such as play, review, pause, fast forward or stop happens) and what information (an information ID) has been used.

As the usage history can be classified by history collection condition such as when the history is collected, the plurality of the usage history is allowed.

The user authorization information 140 indicates information which is allowed to access for the user. For example, it includes information on channels that are requested and not requested to view a TV broadcasting or information on a basic channel and a charged channel.

The user preference information 130 may include a plurality of individual user preference information 130(1), 130(2), . . . , 130(n).

Each individual user preference information 130(1) may include a single user preference item 130(1)-1, a user preference/non-preference 130(1)-2, and a single description 130(1)-3, if any.

In case where the plurality of individual user preference information 130(1), 130(2), . . . , 130(n) need to be identified, the description 130(1)-3 describes application conditions of each user preference information 130 contained in the user preference information 130. When a multiple user preference information is constructed by using the description 130(1)-3, the user selects desired individual user preference information to use, or the desired individual user preference information can be selected automatically, based on the description.

In this regard, since each individual user preference information may include a plurality of individual user preference information, a hierarchical tree structure is formed between the user preference items and each user preference item has a user preference/non-preference value. The user preference/non-preference value may be expressed by values representing steps between 1 (the maximum non-preference) and 10 (the maximum user preference) or may be expressed by a binary value. The user preference/non-preference value may be expressed by a value that accumulates the number of use of information corresponding to each item.

FIG. 3 shows a multiple structure of user preference items of individual user preference information structure of FIG. 2 in accordance with the present invention, in which the user preference items are arranged by multi-stage relying on an environment or a condition of a system used by a user.

For example, a user preference of information in use at home (that is, an individual user preference information 130(m)), a user preference in use at a work place (that is, an individual user preference information 130(k)) and a user preference value of information in use at a different condition may be differently set. In addition, as shown in FIG. 3, under the individual user preference information 130(m), user preference items (1-1, 1-2, 1-3, . . . ) may be arranged, and under the user preference items (1-1, 1-2, 1-3, . . . ), another user preference items (2-1, 2-2, 2-3, . . . ) may be arranged.

Figure 4:
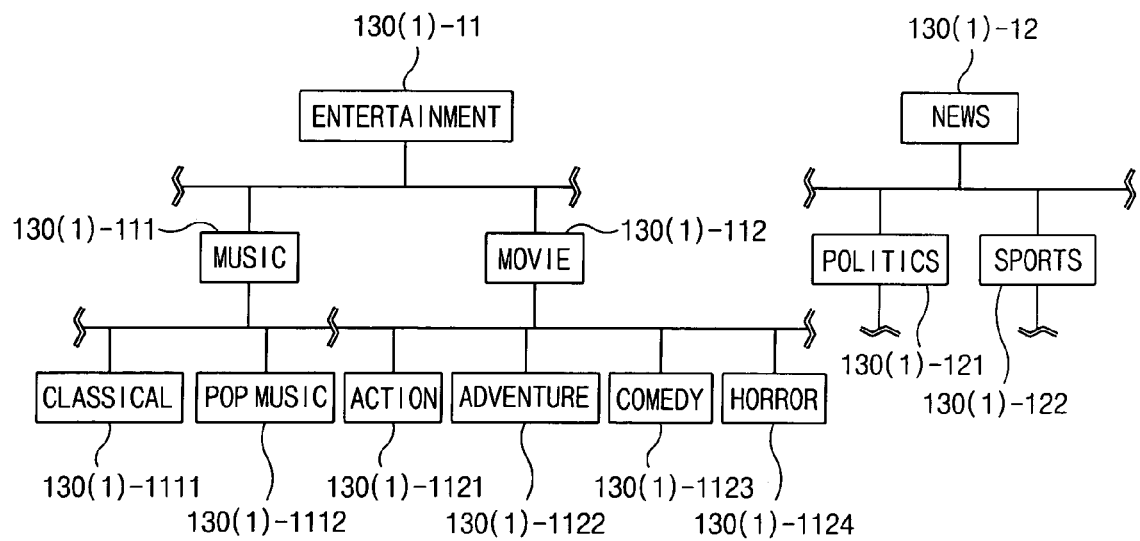
FIG. 4 is a detailed view showing a hierarchical structure of user preference items of FIG. 2 in accordance with the present invention.

FIG. 4 is a detailed view showing a hierarchical structure of user preference items of FIG. 2 in accordance with the present invention.

An entertainment item 130(1)-11 is classified into items of music 130(1)-111, movie 130(1)-112, drama, a game show, a talk show, sports, a variety show and a concert.

The music item 130(1)-111 is classified into items of classic 130(1)-111 and pop music 130(1)-1112.

The movie item 130(1)-112 can be classified into items of an action 130(1)-1121, an adventure 130(1)-1122, a comedy 130(1)-1123, a horror 130(1)-1124, a documentary, a drama, a scientific fiction, children.

The pop music 130(1)-1112 can be classified into items of rock music, ballad, heavy metal, dance music, new age, rhythm & blues, jazz, trot, country western.

Like the classification of the entertainment item 130(1)-11, a news item 130(1)-12 can be classified into items of politics 130(1)-121 and sports 130(1)-122, etc.

Figures 5, 6:
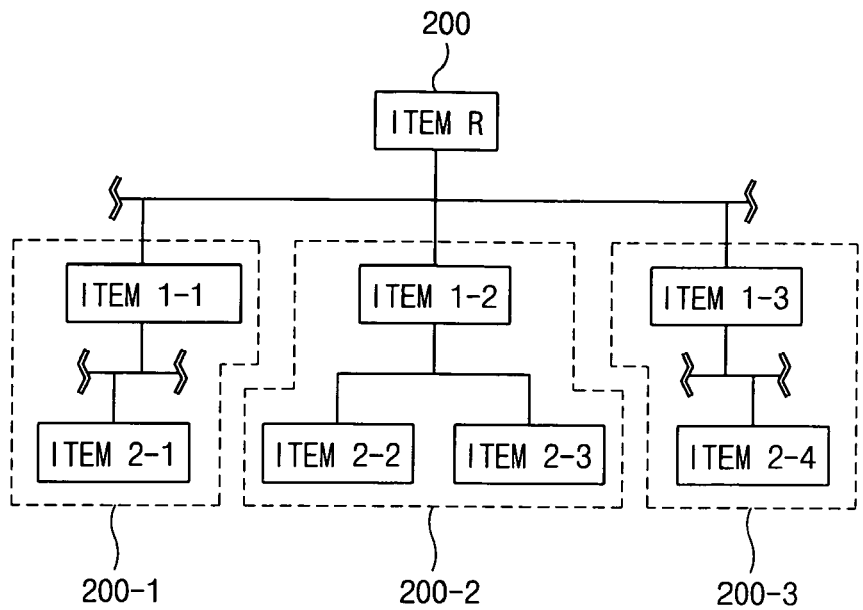
FIG. 5 illustrates a hierarchical structure of an individual user preference information which varies depending on the client device used by a user in accordance with the present invention.
FIG. 6 is a table showing the hierarchical structure of FIG. 2 by using a self-identifier of a user preference item and an identifier of an higher level user preference item in the hierarchical structure in accordance with the present to invention.

FIG. 5 illustrates a hierarchical structure of a user preference according to an instrument used by a user in accordance with the present invention.

As shown in the drawing, in an apparatus for providing only movie or for providing only music, an overall structure 200 can be divided into sub-structures (200-1, 200-2 and 200-3), based on which each individual user preference information (item 1-1, item 1-2, item 1-3) are set and managed.

In this respect, the individual user preference information (item 1-1, item 1-2, item 1-3) can be classified and managed by using a description.

FIGS. 6 through 10 illustrate tables showing individual user preference information of FIG. 2. The hierarchical structure of FIG. 2 can be expressed in several ways.

FIG. 6 is a table showing the hierarchical structure of FIG. 2 by using a self-identifier of a user preference item and an upper item identifier of an upper user preference item in accordance with the present invention;

The method as shown in FIG. 6 has an advantage that a hierarchical structure can be expressed in a predetermined format regardless of its stages.

FIG. 7 is a table showing the hierarchical structure of FIG. 2 by using a coding scheme of the item identifier of FIG. 6 in accordance with the present invention.

The method as shown in FIG. 7 is effective when the highest stage number is predetermined in a multi-stage hierarchical structure. Especially, in this method, time to access the upper items and the lower items is taken short and a relatively less storing space is required.

The item identifier can be divided into fields as many as the number of stages (i.e., 4 stages) having a certain bit and/or byte (i.e., 2 byte), and each field can be expressed as item identifiers ($1^{st}$ 2 bytes, $2^{nd}$ bytes, $3^{rd}$ bytes, $4^{th}$ bytes) of each stage.

That is, in case that 8 byte of item identifier is divided into 4 fields of 2 byte, the first field has the uppermost item identifier and the next field has an item identifier of the next stage. In the 4-stage hierarchical structure, the last-staged item has an item identifier of which none of 4 fields are '0'.

In this respect, in case that the $4^{th}$ field is changed to '0', the very upper field becomes an item identifier, while in case that the $3^{rd}$ and $4^{th}$ field are all changed to '0', the $2^{nd}$ field becomes an item identifier.

For example, in the user preference item, the item identifier of the 'new age' is 1-17-181-205, and the 'new age' item signifies that it belongs to the 'pop music' item having 1-17-181-0 as an item identifier.

As another example taken, in the user preference item, the 'pop music', having the item identifier of 1-17-181-0, belongs to the 'music' having an item identifier of 1-17-0-0, and the 'music', having the item identifier of 1-17-0-0, belongs to the 'entertainment' having an item identifier of 1-0-0-0.

Meanwhile, the 'entertainment' having the identifier of 1-0-0-0 includes items of every item identifier having the form of 1-\*-\*-\*. Especially, the 'entertainment' includes every item having a form of 1-\*-0-0 as items at the very lower stage.

In this method, the identifier of each item is dependent on the identifier of the upper item, and items are differentiated by changing an identifier belonging to a field.

Accordingly, each field may start from '0' and a single field can be expressed by 2 bytes, so that a single item can include 65,535 lower items.

FIG. 8 is a table showing the hierarchical structure of FIG. 2 by using a lowermost user preference in accordance with the present invention.

The method as shown in the drawing is advantageous in that since upper items and relevant user preference values can be all extracted by using only the related information of the lowermost item in the hierarchical structure, the user preference value of the upper items can be calculated on a real time basis, and even if the user preference values of the upper items are not stored, there is no information loss. That is, this method does not require much memory.

As mentioned above, like the method for expressing the individual user preference information structure by using the coding scheme, the individual user preference information structure can be also expressed by using the coding scheme with the same effect.

FIG. 9 is a table showing a hierarchical structure of FIG. 1 by using an item dictionary in accordance with the present invention.

With reference to FIG. 9, items are defined by item identifiers to thereby generate an item dictionary, and a structural relationship between the upper items and the lower items is searched by using the item identifiers defined in the item dictionary.

Although the method in which the hierarchical structure is expressed by using the item dictionary has a shortcomings that the item dictionary is to be always referred to confirm that the hierarchical structural relationship between the user preference items are defined in the item dictionary, the method is advantageous in an aspect that it needs the smallest storing space and an item is easily added or deleted.

Meanwhile, with reference to FIGS. 6 through 9, in the method for expressing the user preference information, the method for editing the user preference information after inputting information includes a user inputting type, an automatically updating type and a mixed type.

The user inputting type is a method that as the user uses certain information, a user preference/non-preference for the information used by the user is received through a dialog box, thereby updating a user preference.

The automatically updating type is a method that as the user uses certain information, a user preference is automatically updated in consideration of user preference items corresponding to the information used by the user in a predetermined standard.

The mixed type refers to a method mixing the user inputting type and the automatically updating type in which the information inputted by the user has a certain weight value, based on which a user preference is updated.

After the user preference/non-preference is edited through the above methods, in order to search information desired by the user, or recommend and provide information to the user, there are two methods: one method is that each user preference/non-preference is directly compared by user preference items to use, and the other method is that a standardized user preference/non-preference is used.

In order to automatically edit the user preference/non-preference on the basis of the information use record of the user, there is a method that items from the uppermost one to the lowermost one are all increased according to the classified item of each use information.

Meanwhile, in case that the individual user preference information is edited in the user preference item dictionary, for example, the user preference related to the upper items, such as 'entertainment', 'music', 'pop music', 'person', 'woman singer' to which the items such as a woman singer 'C' and 'new age' belong, can be also updated together by using only the user preference item information of the woman singer 'C' and 'new age'.

FIG. 10 is a table showing dictionary items for the user preference items in accordance with the present invention.

With reference to FIG. 10, each user preference information is expressed by a set of individual user preference information having user preference/non-preference value by items and expressed by a description indicating an adaptive condition of each individual user preference information, for the whole or partial item dictionary. In this manner, the hierarchical structure of the plurality of user preference items is constructed, edited and managed.

The record of the item dictionary includes a user preference item identifier, a user preference item, a level and an upper item identifier.

The user preference item identifier identifies each user preference item, and the user preference item indicates a content of the information to be provided to the user.

The level indicates the position of each user preference item leveled down from the upper position in the hierarchical structure. The uppermost level is '0'.

The upper item identifier indicates which one of an upper user preference item each user preference item belongs to. In a tree structure, the upper item identifier has an upper user preference item to which itself belongs.

The item dictionary is produced and managed by an information provider, and may exist in a storing unit of the user.

In case that the storing unit of the user includes the item dictionary, the item dictionary existing in the storing unit of the user must have the same content as that of the information provider. If the content of the item dictionary of the information provider is changed, the item dictionary of the user should be changed accordingly.

For example, in case that the user 'A' prefers a piece of music 'S' of a woman singer 'C' and the piece 'S' is included in the 'new age', the user 'A' preference information related to the woman singer 'S' can be constructed as shown in FIGS. 6 through 9.

Figure 11A:
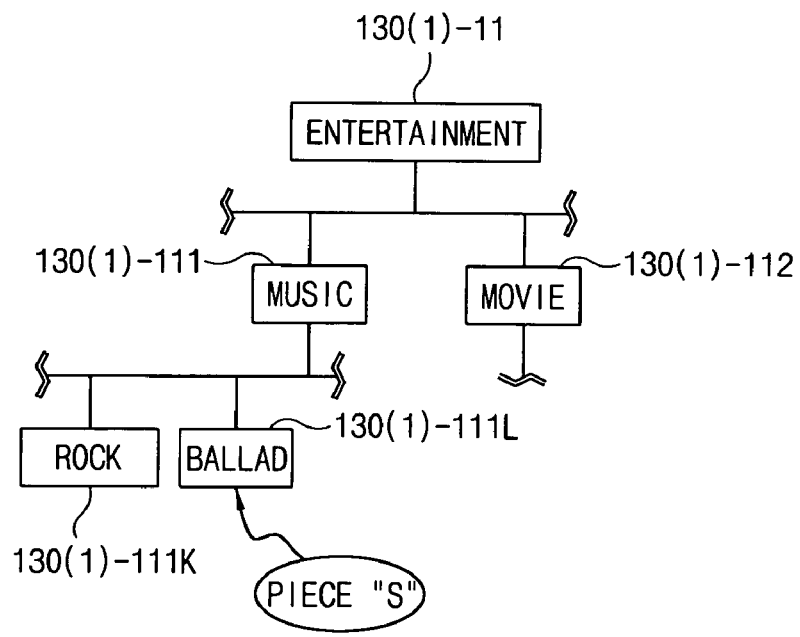
FIG. 11A illustrates a schema showing the hierarchical data structure before it is edited in accordance with the present invention.
Figure 11B:
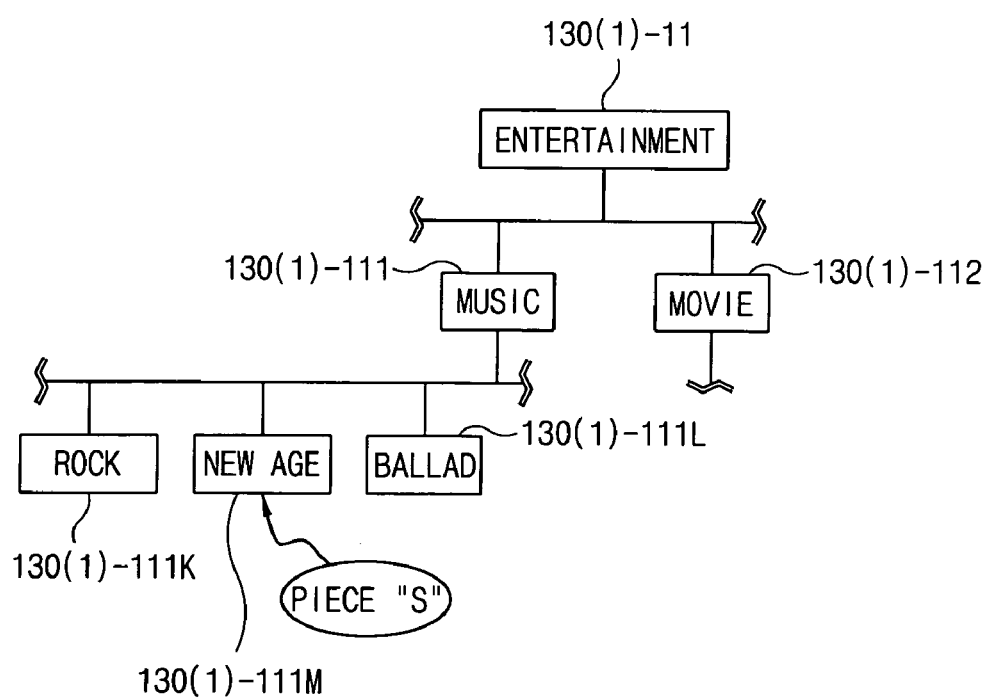
FIG. 11B illustrates a schema showing the hierarchical data structure after it is edited in accordance with the present invention.

FIGS. 11A and 11B illustrate a construction in case that information of the hierarchical data structure is edited, of which FIG. 11A illustrates a construction before information having the hierarchical data structure is edited in accordance with the present invention and FIG. 118 illustrates a construction after information having the hierarchical data structure is edited in accordance with the present invention.

For example, when the piece 'S' was registered in the user preference information, since there was no music genre of 'new age' (that is, an item), the piece 'S' was classified by 'music>pop music>balade 130(1)-111M'.

However, as a pop music of 'new age' 130(1)-111N appears and comes on the stage as a new music genre in the music circle, when the piece 'S' is separated from the 'ballad' to be classified into the 'new age', the user preference can be automatically updated on the user's information use record.

In detail, when the piece 'S' is first classified, the user reduces the user preference value for the piece 'S' in proportion to the number of use in the item of 'music>pop music>ballad' and increases the user preference value as much in the item of 'music>pop music>new age' as newly classified.

In the same way, when pieces of music of which classification has been changed are processed there may be created a user preference on the item of 'music>pop music>new age' newly registered on the basis of the information use record without user's recognition. In this case, the information use record should include the number of use of the information or information making it possible to compute the number of use.

FIGS. 12A and 12B show a case where the classification for the items registered in the item dictionary is changed, of which FIG. 12A is a table showing an item dictionary before it is changed in accordance with the present invention; and FIG. 12B is a table showing an item dictionary before it is changed in accordance with the present invention.

The lower items belonging to the items of pop music and classic music are automatically changed from the lower items of 'entertainment>music>pop music>and 'entertainment>music>classic' to the lower items of 'art>auditory art>pop music' and 'art>auditory art>classic'.

The item dictionary changing method may need additional arithmetic operation. For example, in case that each item includes all of the item identifiers of the upper stage, the item identifiers can be changed.

As stated above, in case that the classification of the user preference items is changed, the user preference corresponding to the entertainment item and the music item, that is, the upper items of the pop music item and the classic item in the preference information by users is reduced in proportion to the user preference generated due to the pop music item and the classic item while the user preference of the newly classified items of the art and the auditory art is proportionally increased.

In addition, in case that the user asks the information provider to recommend new information or is connected with the information provider by using the user preference information and the use record, the information provider can recommend information that can be highly preferred by the user.

In the method for changing the multiple hierarchical data structure, the user preference/non-preference by items is changed by using the user interface.

As so far described, according to the user preference information structure having a multiple hierarchical structure and a multi-media information providing method using the same, the hierarchical data structure that is able to provide the user preference for providing information desired by the user is provided depending on the environment, based on which various information can be provided.

The hierarchical data structure constructing the user preference makes it possible for the user to receive information fitting the situation in which he or she is put by using a proper individual user preference information, automatically or according to user's selection.

In addition, since the user preference items have the hierarchical structure, various level of user preference items can be defined. And, in case that the upper user preference items rather than the lowermost user preference item are selected, a detailed information can be provided to users by using their lower level of user preference for the information belonging to the selected item classification. Also, the user preference of the upper level of user preference items can be constructed by using the user preference of the low level of user preference items.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the meets and bounds of the claims, or equivalence of such meets and bounds are therefore intended to be embraced by the appended claims.

What is claimed is:

1. A method implemented by an apparatus for processing multimedia content and user preferences related to multimedia content consumption, the method comprising:

storing, in a multiple hierarchical data structure, personal information to identify a user;

storing, in the hierarchical data structure, a user preference description to describe the user's preferences for filtering and searching for multimedia content, the hierarchical data structure including a first parent preference element and a second parent preference element at the same level of the hierarchical data structure, the first parent preference element having one or more first child preference elements and including a first content description element and a first preference value that characterizes the user's preference for multimedia content corresponding to the first content description element, wherein the first parent preference element in the hierarchical data structure includes a first preference condition that specifies a first place to which the first parent and first child preference elements apply, and wherein the second parent preference element includes a second content description element, a second preference value, and a second preference condition that specifies a second place to which the second parent preference element applies;

in accordance with the first preference condition, using the first content description element and the first preference value in the first parent preference element for a search and recommendation of selected multimedia content preferred by the user at the first place from multimedia content available in a television broadcast environment from an information provider; and at the first place, receiving at least a portion of the selected multimedia content based on a result of the search and recommendation in accordance with the first preference condition.

2. The method of claim 1, further comprising:
receiving user input defining at least a portion of the first parent and first child preference elements.

3. The method of claim 1, further comprising:
storing, in the hierarchical data structure, a usage history describing events of consuming multimedia content.

4. The method of claim 1, wherein the first content description element in the first parent preference element specifies a multimedia genre.

5. The method of claim 1, wherein the first content description element in the first parent preference element specifies an actor or a director.

6. The method of claim 1, wherein one of the first child preference elements of the first parent preference element includes a further preference condition.

7. The method of claim 1, further comprising:
updating the user preference description.

8. The method of claim 1, wherein the personal information includes a user identifier specifying a name for the user.

9. A method implemented by an apparatus for processing multimedia content and user preferences related to multimedia content consumption, the method comprising:

receiving a user preference description in a multiple hierarchical data structure to describe a user's preferences for filtering and searching for multimedia content, the hierarchical data structure including a first parent preference element and a second parent preference element at the same level of the hierarchical data structure, the first parent preference element having one or more first child preference elements and including a first content description element and a first preference value that characterizes the user's preference for multimedia content corresponding to the first content description element, wherein the first parent preference element in the hierarchical data structure includes a first preference condition that specifies a first place to which the first parent and first child preference elements apply, and wherein the second parent preference element includes a second content description element, a second preference value, and a second preference condition that specifies a second place to which the second parent preference element applies;

in accordance with the first preference condition, using the first content description element and the first preference value in the first parent preference element for a search and recommendation of selected multimedia content preferred by the user at the first place from multimedia content available in a television broadcast environment from an information provider; and at the first place, receiving at least a portion of the selected multimedia content based on a result of the search and recommendation in accordance with the first preference condition.

10. The method of claim 9, wherein the first content description element in the first parent preference element specifies a multimedia genre.

11. The method of claim 9, wherein the first content description element in the first parent preference element specifies an actor or a director.

12. The method of claim 9, wherein one of the first child preference elements includes a further preference condition.

13. The method of claim 9, further comprising: updating the user preference description.

14. The method of claim 9, further comprising: storing the user preference description.

15. The method of claim 9, wherein the user preference description is associated with a user identifier that includes a name for the user.

16. A system for processing multimedia content and user preferences related to multimedia content consumption, the system comprising:

a data storage device; and data processing apparatus configured to perform operations comprising:

providing, in a multiple hierarchical data structure, a user preference description to describe a user's preferences for filtering and searching for multimedia content, the hierarchical data structure including a first parent preference element and a second parent preference element at the same level of the hierarchical data structure, the first parent preference element having one or more first child preference elements and including a first content description element and a first preference value that characterizes the user's preference for multimedia content corresponding to the first content description element, wherein the first parent preference element in the hierarchical data structure includes a first preference condition specifying a first place to which the first parent and first child preference elements apply, and wherein the second parent preference element includes a second content description element, a second preference value, and a second preference condition that specifies a second place to which the second parent preference element applies;

storing the hierarchical data structure with the user preference description in the data storage device;

in accordance with the first preference condition, using the first content description element and the first preference value in the first parent preference element for a search and recommendation of selected multimedia content preferred by the user at the first place from multimedia content available in a television broadcast environment from an information provider; and at the first place, receiving at least a portion of the selected multimedia content based on a result of the search and recommendation in accordance with the first preference condition.

17. The system of claim 16, wherein providing the user preference description includes receiving user input defining at least a portion of the first parent and first child preference elements.

18. The system of claim 16, wherein the data processing apparatus is further configured to perform operations comprising:

storing, in the data storage device as a portion of the hierarchical data structure, a usage history describing events of consuming multimedia content.

19. The system of claim 16, wherein the first content description element in the first parent preference element specifies a multimedia genre.

20. The system of claim 16, wherein the data processing apparatus is further configured to perform operations comprising:

updating the user preference description.

21. A system for processing multimedia content and user preferences related to multimedia content consumption, the system comprising:

a data storage device to store, in a multiple hierarchical data structure, a user preference description to describe a user's preferences for filtering and searching for multimedia content, the hierarchical data structure including a first parent preference element and a second parent preference element at the same level of the hierarchical data structure, the first parent preference element having one or more first child preference elements and including a first content description element and a first preference value that characterizes the user's preference for multimedia content corresponding to the first content description element, wherein the first parent preference element includes a first preference condition specifying a first place to which the first parent and first child preference elements apply, and wherein the second parent preference element includes a second content description element, a second preference value, and a second preference condition that specifies a second place to which the second parent preference element applies; and data processing apparatus configured to perform operations comprising:

receiving the user preference description from the data storage device;

in accordance with the first preference condition, using the first content description element and the first preference value in the first parent preference element for a search and recommendation of selected multimedia content preferred by the user at the first place from multimedia content available in a television broadcast environment from an information provider, and at the first place, receiving at least a portion of the selected multimedia content based on a result of the search and recommendation in accordance with the first preference condition.

22. The system of claim 21, wherein the first content description element in the first parent preference element specifies a multimedia classification attribute.

23. The system of claim 21, wherein the data processing apparatus is further configured to perform operations comprising:
   updating the user preference description.

24. A computer program product, tangibly embodied in a computer readable medium, for processing multimedia content and user preferences related to multimedia content consumption, the computer program comprising instructions to cause data processing apparatus to perform operations comprising:
   storing, in a multiple hierarchical data structure, personal information to identify a user;
   storing, in the hierarchical data structure, user preference description to describe the user's preferences for filtering and searching for multimedia content, the hierarchical data structure including a first parent preference element and a second parent preference element having, the first parent preference element having one or more first child preference elements and including a first content description element and a first preference value that characterizes the user's preference for multimedia content corresponding to the first content description element, wherein the first parent preference element in the hierarchical data structure includes a first preference condition specifying a first place to which the first parent and first child preference elements apply, and wherein the second parent preference element includes a second content description element, a second preference value, and a second preference condition that specifies a second place to which the second parent preference element applies;
   in accordance with the first preference condition, using the first content description element and the first preference value in the first parent preference element for a search and recommendation of selected multimedia content preferred by the user at the first place from multimedia content available in a television broadcast environment from an information provider; and
   at the first place, receiving at least a portion of the selected multimedia content based on a result of the search and recommendation in accordance with the first preference condition.

25. The computer program product of claim 24, wherein the computer program further includes instructions to cause the data processing apparatus to perform operations comprising:
   storing, in the hierarchical data structure, a usage history describing events of consuming multimedia content.

26. A computer program product, tangibly embodied in a computer readable medium, for processing multimedia content and user preference related to multimedia content consumption, the computer program comprising instructions to cause data processing apparatus to perform operations comprising:
   receiving a user preference description in a multiple hierarchical data structure to describe a user's preferences for filtering and searching for multimedia content, the hierarchical data structure including a first parent preference element and a second parent preference element, the first parent preference element having one or more first child preference elements, and including a first content description element and a first preference value that characterizes the user's preference for multimedia content corresponding to the first content description element, wherein the first parent preference element includes a first preference condition specifying a first place to which the first parent and first child preference elements apply, and wherein the second parent preference element includes a second content description element, a second preference value, and a second preference condition that specifies a second place to which the second parent preference element applies;
   in accordance with the first preference condition, using the first content description element and the first preference value in the first parent preference element for a search and recommendation of selected multimedia content preferred by the user at the first place from multimedia content available in a television broadcast environment from an information provider; and
   at the first place, receiving at least a portion of the selected multimedia content based on a result of the search and recommendation in accordance with the first preference condition.

* * * * *